United States Patent
Okouneva

(10) Patent No.: US 9,563,951 B2
(45) Date of Patent: Feb. 7, 2017

(54) VEHICLE VISION SYSTEM WITH TARGETLESS CAMERA CALIBRATION

(71) Applicant: MAGNA ELECTRONICS INC., Auburn Hills, MI (US)

(72) Inventor: Galina Okouneva, Markham (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 225 days.

(21) Appl. No.: 14/282,028

(22) Filed: May 20, 2014

(65) Prior Publication Data
US 2014/0347486 A1 Nov. 27, 2014

Related U.S. Application Data

(60) Provisional application No. 61/878,877, filed on Sep. 17, 2013, provisional application No. 61/825,752, filed on May 21, 2013.

(51) Int. Cl.
*G06T 7/00* (2006.01)
*B60R 1/00* (2006.01)

(52) U.S. Cl.
CPC ............... *G06T 7/0018* (2013.01); *B60R 1/00* (2013.01); *G06T 7/0071* (2013.01);
(Continued)

(58) Field of Classification Search
CPC .................. G06T 7/0018; G06T 2207/10004; G06T 2207/10016; G06T 2207/30252; B60R 1/00; B60R 2300/607; B60R 2300/802; B60R 2300/30
(Continued)

(56) References Cited

U.S. PATENT DOCUMENTS 4,961,625 A 10/1990 Wood et al.
4,966,441 A 10/1990 Conner
(Continued)

FOREIGN PATENT DOCUMENTS

EP 0353200 1/1990
EP 0361914 2/1993
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Tung Vo
*Assistant Examiner* — Zaihan Jiang
(74) *Attorney, Agent, or Firm* — Gardner, Linn, Burkhart & Flory, LLP

(57) ABSTRACT

A camera calibration system of a vehicle includes a camera disposed at a vehicle and having a field of view exterior of the vehicle. The camera is operable to capture image data. An image processor operable to process image data captured by the camera. The camera calibration system is operable to generate camera calibration parameters utilizing a bundle adjustment algorithm. Responsive to image processing of captured image data during movement of the vehicle along an arbitrary path, and responsive to the bundle adjustment algorithm, the camera calibration system is operable to calibrate the camera. The bundle adjustment algorithm may iteratively refine calibration parameters starting from a known initial estimation.

20 Claims, 13 Drawing Sheets

Legend:
K – number of camera views
N – number of selected feature points
$X_w, Y_w, Z_w$ – world coordinates of a feature point
$T_{12}$ – transformation between two camera views

(52) U.S. Cl.
CPC .............. *B60R 2300/402* (2013.01); *G06T 2207/10016* (2013.01); *G06T 2207/20164* (2013.01); *G06T 2207/30252* (2013.01)

(58) Field of Classification Search
USPC ........................................................ 348/148
See application file for complete search history.

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam |
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,498,620 B2 | 12/2002 | Schofield et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,807,287 B1 | 10/2004 | Hermans |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |

(56) References Cited

U.S. PATENT DOCUMENTS

| | | | |
|---|---|---|---|
| 7,092,548 B2 | 8/2006 | Laumeyer et al. | |
| 7,113,867 B1 | 9/2006 | Stein | |
| 7,116,246 B2 | 10/2006 | Winter et al. | |
| 7,123,168 B2 | 10/2006 | Schofield | |
| 7,133,661 B2 | 11/2006 | Hatae et al. | |
| 7,149,613 B2 | 12/2006 | Stam et al. | |
| 7,151,996 B2 | 12/2006 | Stein | |
| 7,202,776 B2 | 4/2007 | Breed | |
| 7,227,459 B2 | 6/2007 | Bos et al. | |
| 7,227,611 B2 | 6/2007 | Hull et al. | |
| 7,325,934 B2 | 2/2008 | Schofield et al. | |
| 7,325,935 B2 | 2/2008 | Schofield et al. | |
| 7,338,177 B2 | 3/2008 | Lynam | |
| 7,375,803 B1 | 5/2008 | Bamji | |
| 7,380,948 B2 | 6/2008 | Schofield et al. | |
| 7,388,182 B2 | 6/2008 | Schofield et al. | |
| 7,423,821 B2 | 9/2008 | Bechtel et al. | |
| 7,425,076 B2 | 9/2008 | Schofield et al. | |
| 7,526,103 B2 | 4/2009 | Schofield et al. | |
| 7,541,743 B2 | 6/2009 | Salmeen et al. | |
| 7,565,006 B2 | 7/2009 | Stam et al. | |
| 7,566,851 B2 | 7/2009 | Stein et al. | |
| 7,605,856 B2 | 10/2009 | Imoto | |
| 7,619,508 B2 | 11/2009 | Lynam et al. | |
| 7,720,580 B2 | 5/2010 | Higgins-Luthman | |
| 7,786,898 B2 | 8/2010 | Stein et al. | |
| 7,792,329 B2 | 9/2010 | Schofield et al. | |
| 7,843,451 B2 | 11/2010 | Lafon | |
| 7,855,778 B2 | 12/2010 | Yung et al. | |
| 7,881,496 B2 | 2/2011 | Camilleri | |
| 7,914,187 B2 | 3/2011 | Higgins-Luthman et al. | |
| 7,930,160 B1 | 4/2011 | Hosagrahara et al. | |
| 7,949,486 B2 | 5/2011 | Denny et al. | |
| 8,017,898 B2 | 9/2011 | Lu et al. | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,378,851 B2 | 2/2013 | Stein et al. | |
| 8,421,865 B2 | 4/2013 | Euler et al. | |
| 8,452,055 B2 | 5/2013 | Stein et al. | |
| 8,553,088 B2 | 10/2013 | Stein et al. | |
| 9,201,424 B1* | 12/2015 | Ogale | G05D 1/0094 |
| 2002/0005778 A1 | 1/2002 | Breed | |
| 2002/0011611 A1 | 1/2002 | Huang et al. | |
| 2002/0113873 A1 | 8/2002 | Williams | |
| 2003/0103142 A1 | 6/2003 | Hitomi et al. | |
| 2003/0137586 A1 | 7/2003 | Lewellen | |
| 2003/0222982 A1 | 12/2003 | Hamdan et al. | |
| 2004/0164228 A1 | 8/2004 | Fogg et al. | |
| 2005/0219852 A1 | 10/2005 | Stam et al. | |
| 2005/0237385 A1 | 10/2005 | Kosaka et al. | |
| 2006/0050018 A1 | 3/2006 | Hutzel et al. | |
| 2006/0091813 A1 | 5/2006 | Stam et al. | |
| 2006/0103727 A1 | 5/2006 | Tseng | |
| 2006/0250501 A1 | 11/2006 | Wildmann et al. | |
| 2007/0024724 A1 | 2/2007 | Stein et al. | |
| 2007/0104476 A1 | 5/2007 | Yasutomi et al. | |
| 2007/0242339 A1 | 10/2007 | Bradley | |
| 2008/0043099 A1 | 2/2008 | Stein et al. | |
| 2008/0147321 A1 | 6/2008 | Howard et al. | |
| 2008/0192132 A1 | 8/2008 | Bechtel et al. | |
| 2008/0266396 A1 | 10/2008 | Stein | |
| 2009/0113509 A1 | 4/2009 | Tseng et al. | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2009/0290032 A1 | 11/2009 | Zhang et al. | |
| 2011/0216201 A1 | 9/2011 | McAndrew et al. | |
| 2012/0045112 A1 | 2/2012 | Lundblad et al. | |
| 2012/0069185 A1 | 3/2012 | Stein | |
| 2012/0200707 A1 | 8/2012 | Stein et al. | |
| 2012/0314071 A1 | 12/2012 | Rosenbaum et al. | |
| 2012/0320209 A1 | 12/2012 | Vico | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0218398 A1* | 8/2013 | Gandhi | B60R 16/02 701/31.1 |
| 2013/0286193 A1* | 10/2013 | Pflug | B60R 1/00 348/135 |
| 2014/0043473 A1 | 2/2014 | Rathi et al. | |
| 2014/0063254 A1 | 3/2014 | Shi et al. | |
| 2014/0098229 A1 | 4/2014 | Lu et al. | |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0333729 A1 | 11/2014 | Pflug | |
| 2014/0347486 A1 | 11/2014 | Okouneva | |
| 2014/0350834 A1 | 11/2014 | Turk | |

FOREIGN PATENT DOCUMENTS

| | | |
|---|---|---|
| EP | 0640903 | 3/1995 |
| EP | 0697641 | 2/1996 |
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | S62-131837 | 6/1987 |
| JP | 01123587 | 5/1989 |
| JP | H1168538 | 7/1989 |
| JP | H236417 | 8/1990 |
| JP | 03099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO2012139636 | 10/2012 |
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Franke et al., "Autonomous driving approaches downtown", Intelligent Systems and Their Applications, IEEE 13 (6), 40-48, Nov./Dec. 1999.

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

(56) References Cited

OTHER PUBLICATIONS

Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vlacic et al. (Eds), "Intelligent Vehicle Tecnologies, Theory and Applications", Society of Automotive Engineers Inc., edited by SAE International, 2001.
Zheng et al., "An Adaptive System for Traffic Sign Recognition," IEEE Proceedings of the Intelligent Vehicles '94 Symposium, pp. 165-170 (Oct. 1994).

\* cited by examiner

Structure-from-Motion matrix equation solves for World Coordinates $X_W$ of feature points:

$$\mathbf{X}_{im} = \mathbf{P}^0 \times \mathbf{X}_W$$

- $\mathbf{X}_W = (X_W^1, Y_W^1, Z_W^1, 1, \ldots, X_W^N, Y_W^N, Z_W^N, 1)^T$ – vector (unknown) of World Coordinate s;
- $\mathbf{x}_{im} = (x_{im1}^{p1}, y_{im1}^{p1}, 1, \ldots, x_{imK}^{p1}, y_{imK}^{p1}, 1, \ldots, x_{im1}^{pN}, y_{im1}^{pN}, 1, \ldots, x_{imK}^{pN}, y_{imK}^{pN}, 1)^T$ – vecto r (known) of normalized image coordinate s of points $p1,\ldots pN$ in images $1,\ldots K$;
- $\mathbf{P}^0_{3K \times 4N}$ = blkdiag ($\mathbf{P}^0_{ij}$) - combined blok - diagonal projective matrix (known);

where $\mathbf{P}^0_{ij} = \mathbf{K}_{cal} \times \mathbf{R}^0_{cal} \times \mathbf{T}^0_{cal} \times \mathbf{C}_{ij}$ – projective matrices represent motion between frames ;

- $\mathbf{K}_{cal}$ - intrinsic parameter matrix (known);
- $\mathbf{R}^0_{cal}(Yaw^0, Pitch^0, Roll^0)$ - matrix of calibratio n angles (known);
- $\mathbf{T}^0_{cal}(X^0_{cal}, Y^0_{cal}, Z^0_{cal})$ - matrix of translati onal calibtatio n components (known);
- $\mathbf{C}_{ij}(x_{ij}, y_{ij}, \psi_{ij})$ - matrix composed parameters of of motion between image frames $i$ and $j$ (known from Kinematic Model);

FIG. 7

Bundle Adjustment is a numerical procedure which simultaneously solves for Calibration Parameters and World Coordinates of selected features

Required Data: Estimation of World Coordinates $X_W$ of feature point and initial estimation of six calibration parameters $(Yaw^0, Pitch^0, Roll^0, X_{cal}^0, Y_{cal}^0, Z_{cal}^0)$ $$\mathbf{x}_{im} = \mathbf{P} \times \mathbf{X}_W$$

- $\mathbf{X}_W = (X_W^1, Y_W^1, Z_W^1, 1, ..., X_W^N, Y_W^N, Z_W^N, 1)^T$ – vector (known) of World Coordinates;
- $\mathbf{x}_{im} = (x_{im1}^{p1}, y_{im1}^{p1}, 1, ..., x_{imK}^{p1}, y_{imK}^{p1}, 1, ..., x_{im1}^{pN}, y_{im1}^{pN}, 1, ..., x_{imK}^{pN}, y_{imK}^{pN}, 1)^T$ – vector (known) of normalized image coordinates of points $p1,..., pN$ in images $1...K$;
- $\mathbf{P}_{3K \times 4N} = \text{blkdiag}(\mathbf{P}_{ij})$ – combined blok-diagonal projective matrix (unknown); where $\mathbf{P}_{ij} = \mathbf{K}_{cal} \times \mathbf{R}_{cal} \times \mathbf{T}_{cal} \times \mathbf{C}_{ij}$ – projective matrices represent motion between frames;
- $\mathbf{K}_{cal}$ – intrinsic parameter matrix (known);
- $\mathbf{R}_{cal}(Yaw, Pitch, Roll)$ – matrix of calibration angles (unknown);
- $\mathbf{T}_{cal}(X_{cal}, Y_{cal}, Z_{cal})$ – matrix of translational calibration components (unknown);
- $\mathbf{C}_{ij}(x_{ij}, y_{ij}, \psi_{ij})$ – matrix composed of parameters of camera motion between image frames $i$ and $j$ (known from Kinematic Model);

FIG. 8

Extraction and Matching of Feature Descriptors

- For each detected feature in each image in the sequence, build a descriptor, an m-dimensional vector $(a^1_{im\_i}, \ldots, a^m_{im\_i})$, based on the image information in the neighborhood of the feature
- Match the descriptor based on their distance $d_{ij}$ from each other in Frames $i$ and $j$

Input: Image coordinates of the detected features in each image
Output: A descriptor for each feature, a list of matched feature and a match metric

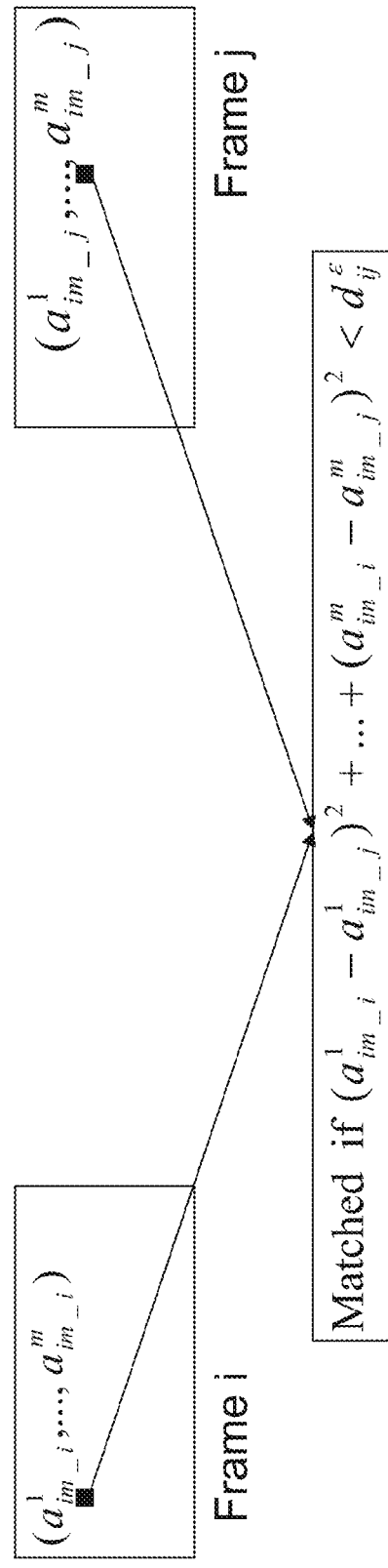

Matched if $(a^1_{im\_i} - a^1_{im\_j})^2 + \ldots + (a^m_{im\_i} - a^m_{im\_j})^2 < d^\varepsilon_{ij}$

FIG. 10

Create Feature Tracks

For each feature $l$ create a feature track $$FT_i^{pl} = (x_{im\_i}^{pl}, y_{im\_i}^{pl}, x_{im\_j}^{pl}, y_{im\_j}^{pl}, s_{ij}^1, s_{ij}^2, \psi_{ij})$$

Input:
- A feature $l$ detected in Frame $i$
- A valid angle of vehicle front wheel between Frames $i$ and $j$ is $\delta_f < 30^0$

Output: A collection of feature tracks $$FT = \bigcup\{FV_t^{ps}\}, ps \in \{\text{all tracked features}\}, t \in \{\text{all frames}\}$$

which combines all feature tracks for all tracked features

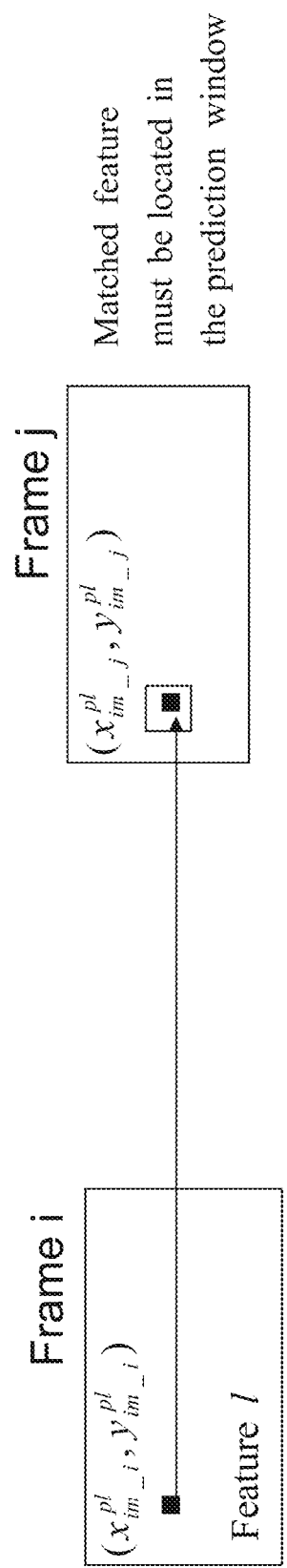

Feature Track $FT_i^{pl}$ for Feature $l$ detected in Frame $i$

FIG. 11

Feature Filtering

- To enhance the SfM and BA accuracy by:
  - Eliminating feature pairs which do not satisfy the established rules for valid feature pairs in valid frame pairs

Valid Feature Satisfies the Rules :

- x- and y- pixel motion must be greater than 3 *pix* between frames
- Must have a matched feature inside the prediction window
- Must be located outside the NaN zone in the unwarped image space
- Must satisfy the inequality $x_{im\_i} \, F \, x_{im\_j} < D_\varepsilon$, where $D_\varepsilon$ is a tolerance, and F is the fundamental matrix
- Match metric score must satisfy the inequality $d_{ij}^\varepsilon < d_\varepsilon$

FIG. 13

VEHICLE VISION SYSTEM WITH TARGETLESS CAMERA CALIBRATION

CROSS REFERENCE TO RELATED APPLICATIONS

The present application claims the filing benefits of U.S. provisional applications Ser. No. 61/878,877, filed Sep. 17, 2013, and Ser. No. 61/825,752, filed May 21, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a collision avoidance system or vision system or imaging system for a vehicle that utilizes one or more cameras (such as one or more CMOS cameras) to capture image data representative of images exterior of the vehicle, and provides a calibration system that is operable to determine calibration parameters for the camera or cameras of the vision system without use of fiducial markers or targets in the field of view of the camera or cameras.

The cameras (such as one or more CMOS cameras) capture image data representative of images exterior of the vehicle, and provide the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

These and other objects, advantages, purposes and features of the present invention will become apparent upon review of the following specification in conjunction with the drawings.

BRIEF DESCRIPTION OF THE DRAWINGS

FIG. 7 shows details of a structure from motion algorithm or process suitable for use with the system of the present invention;

FIG. 8 shows details of a bundle adjustment process of the system of the present invention;

FIG. 10 shows details of an extraction and matching of features process of the system of the present invention;

FIG. 11 shows details of a feature matching process of the system of the present invention;

FIG. 13 shows details of a feature filtering process of the system of the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
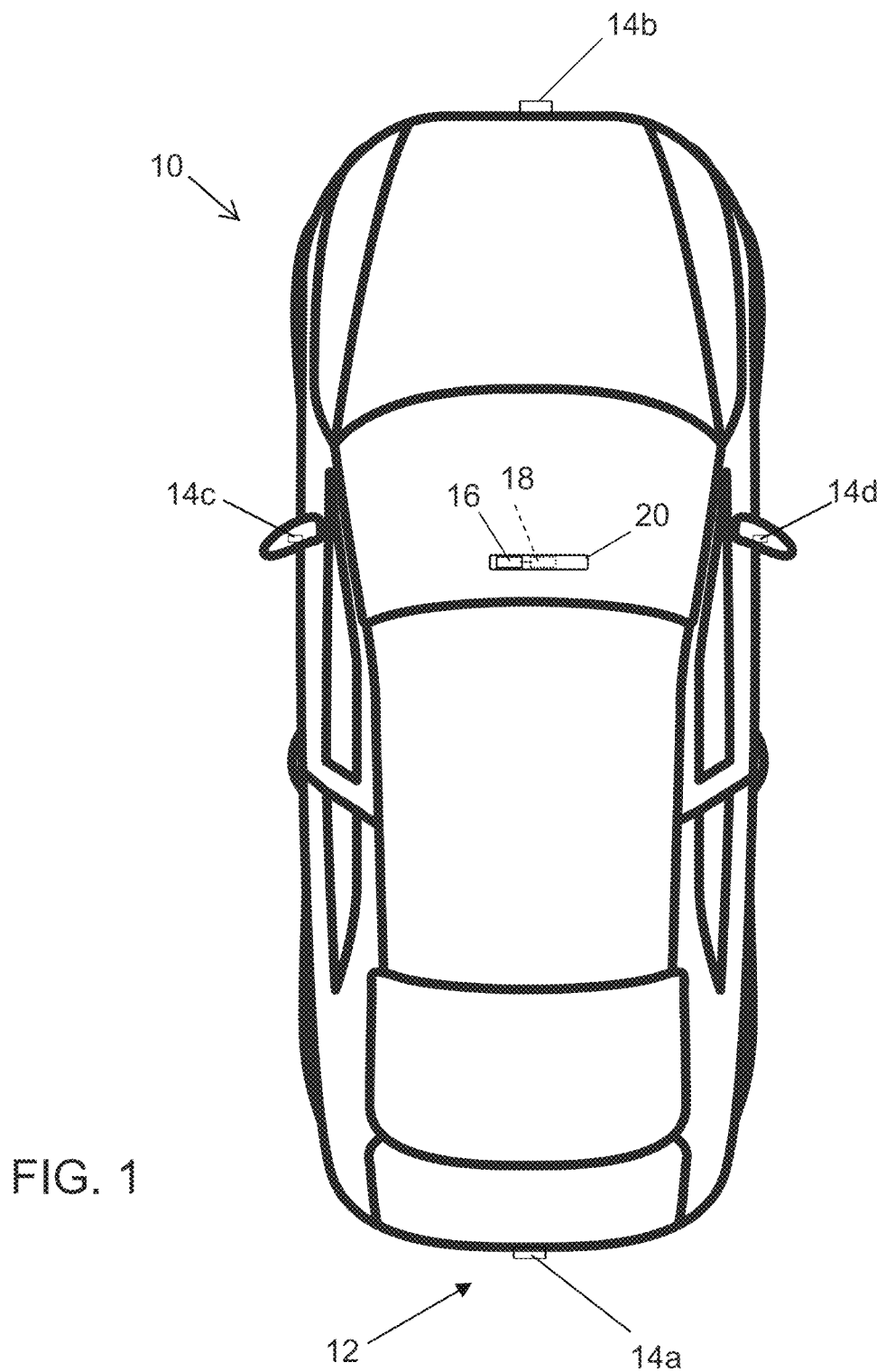
FIG. 1 is a plan view of a vehicle with a vision system that incorporates cameras in accordance with the present invention.
Figures 2, 3:
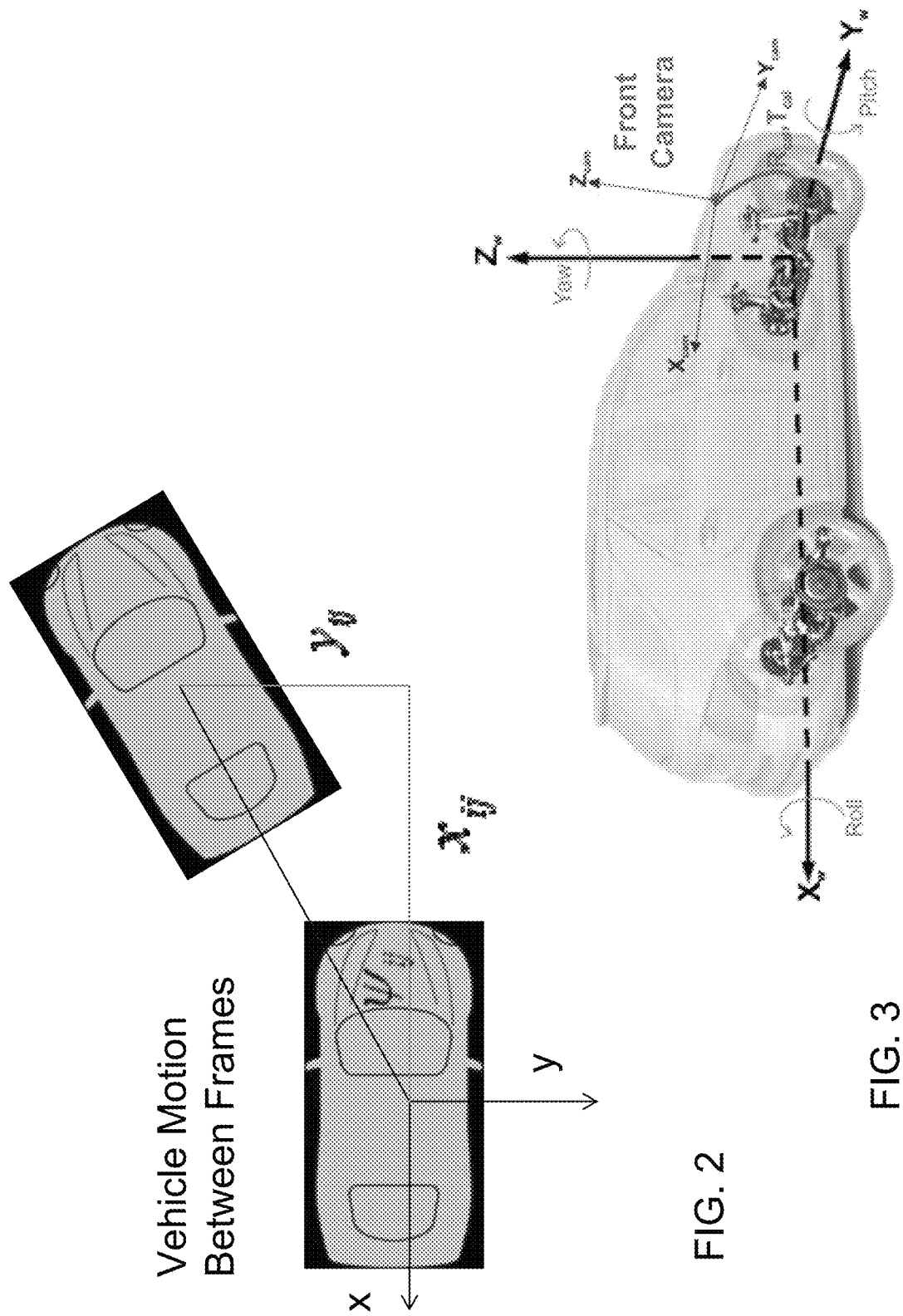
FIG. 2 is a schematic showing the coordinate system and angles used to represent the travel of the vehicle during calibration.
FIG. 3 is a perspective view and schematic of the vehicle.
Figure 4:
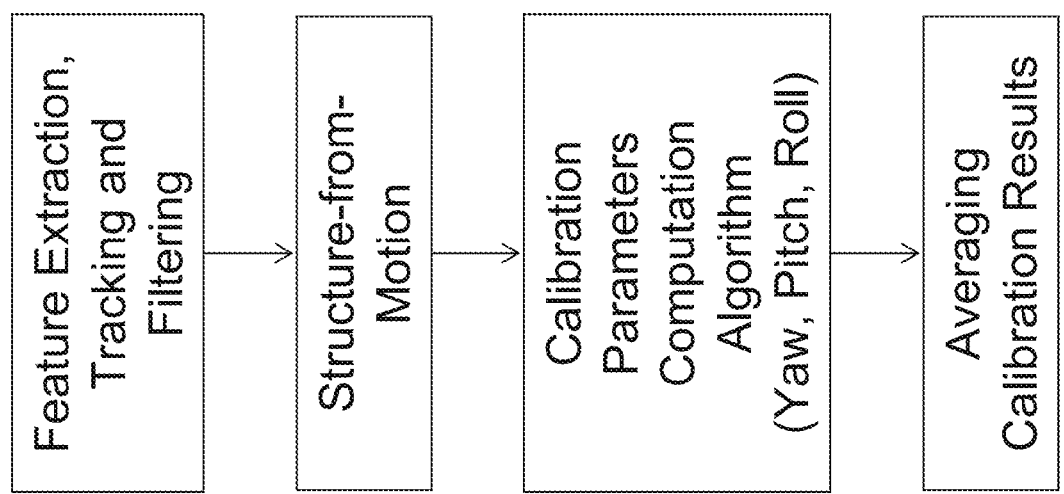
FIG. 4 is a top level flow chart of the targetless software calibration (TSC) algorithm of the present invention.
Figure 5:
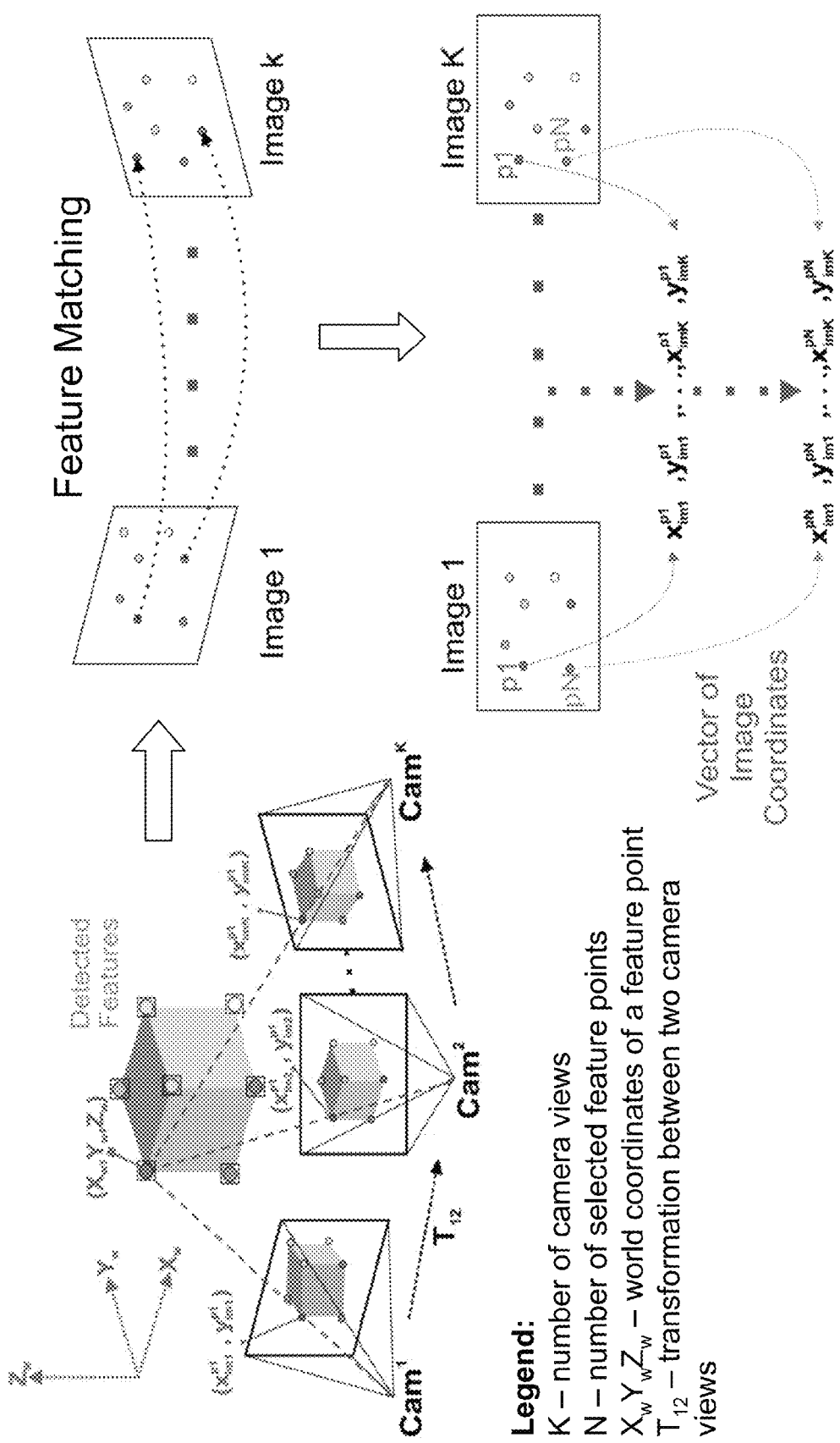
FIG. 5 is a schematic showing the data acquisition and feature extraction of the system of the present invention.
Figure 6A:
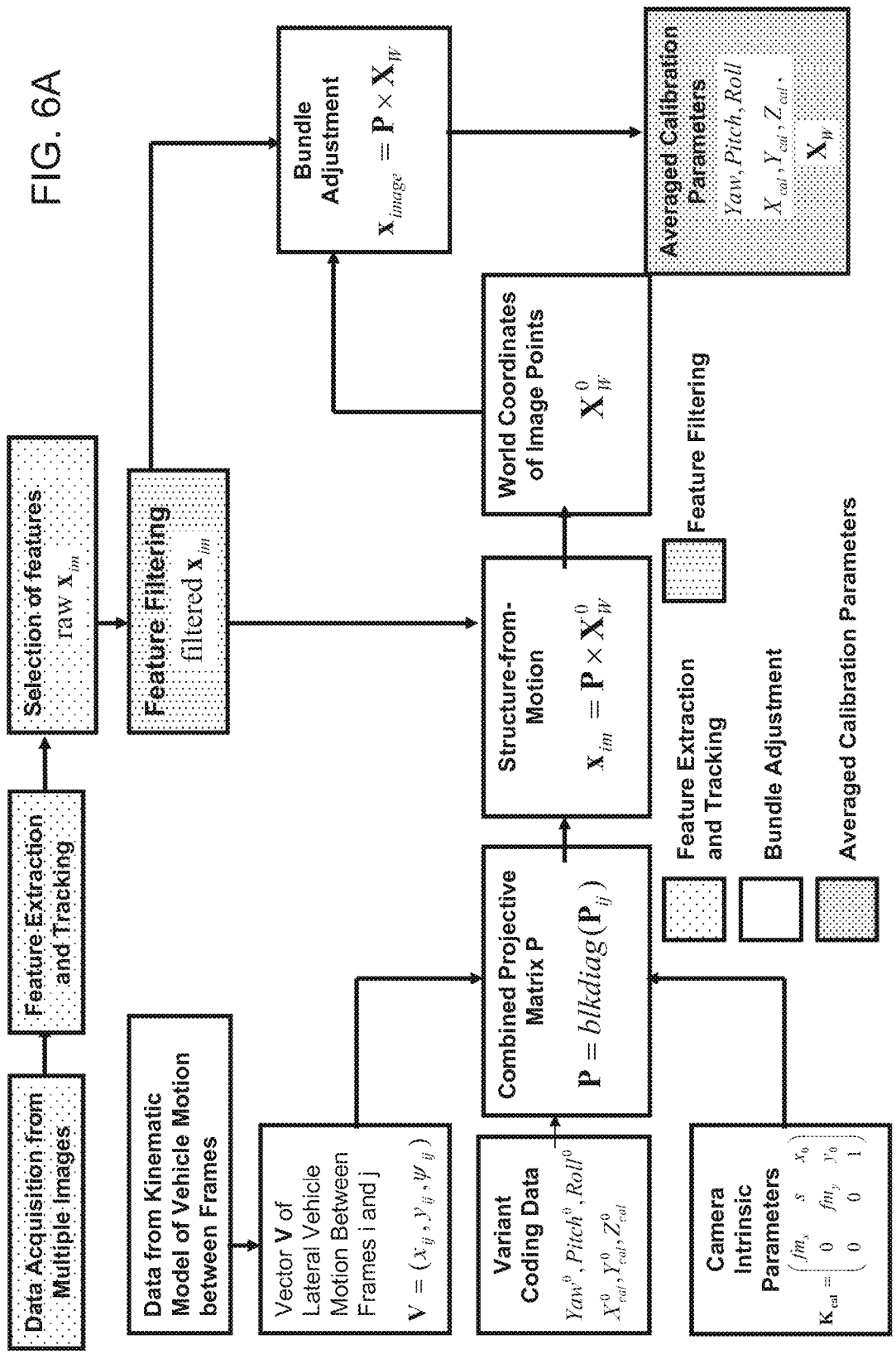
FIGS. 6A and 6B are flowcharts of the targetless calibration algorithm of the present invention.
Figure 6B:
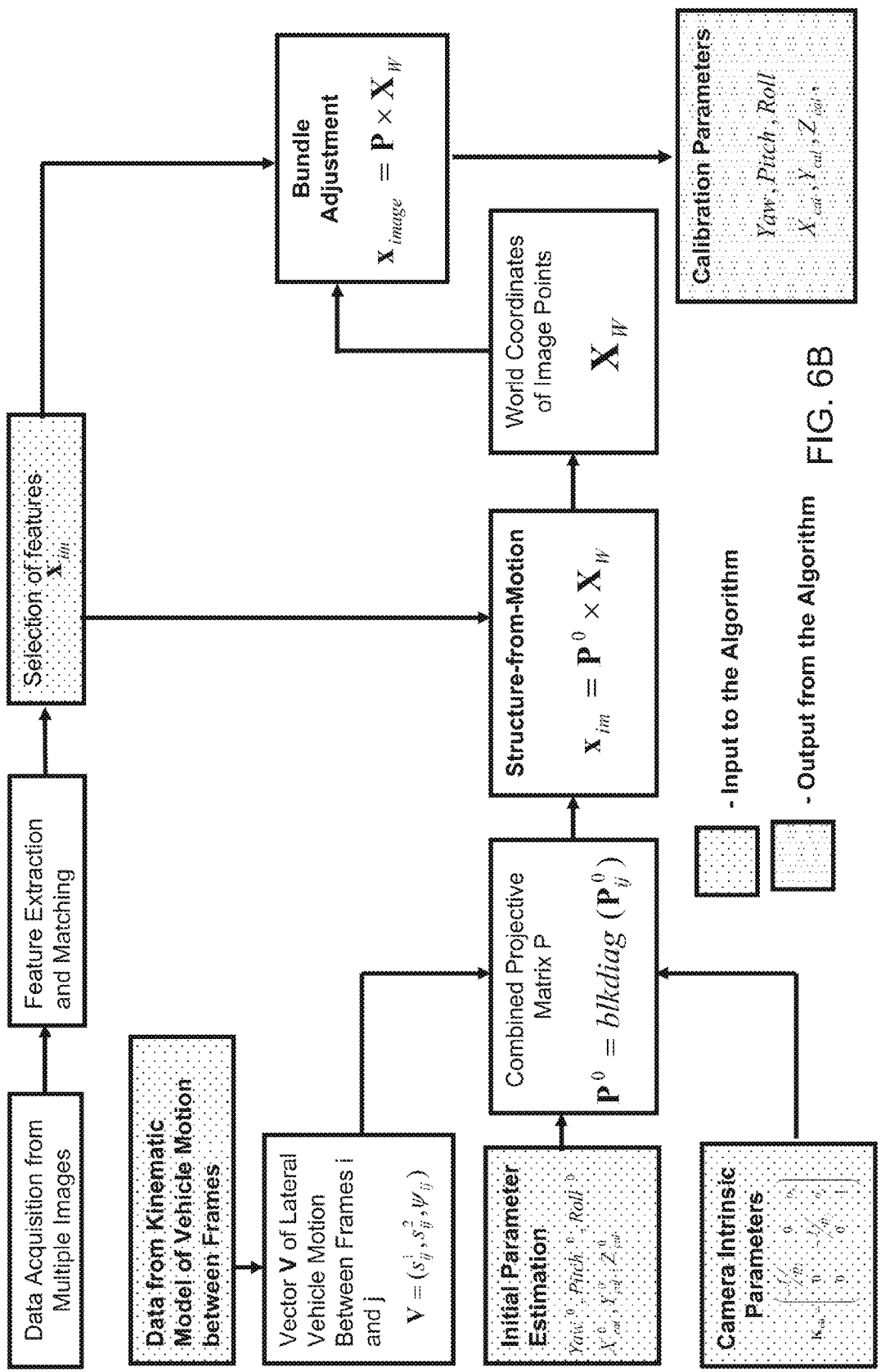

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The cameras operate to capture frames of image data at a desired or selected frame rate, such as, for example, about 30 frames per second or more or less. The data transfer or signal communication from the camera to the ECU may comprise any suitable data or communication link, such as a vehicle network bus or the like of the equipped vehicle.

The present invention provides a targetless calibration system or targetless software calibration (TSC) for calibrating cameras of a vehicle vision system. The calibration system generates camera calibration parameters, such as translational components: X, Y, Z (mm); and rotational components: Yaw, Pitch, and Roll angles (degrees). No specific vehicle motion required, and the calibration is performed as the vehicle navigates along an arbitrary path. The bundle adjustment may be a core feature of the targetless software calibration, and iteratively refines calibration parameters starting from a known initial estimation. The system uses bundle adjustment (BA) inputs, including image coordinates of matched scene features between two frames of captured image data, vehicle motion vector (V=[S1, S2, ψ]) between two frames of captured image data, an initial estimation of calibration parameters, and/or three dimensional (3D) coordinates of features (such as via a structure from motion algorithm or the like). The vehicle motion vector (V) may be computed using only vehicle CAN Bus data, and may be independent of any image data captured by the camera or cameras of the vehicle.

The system of the present invention thus may provide an algorithm that performs a fast and reliable on-line targetless calibration of one or more cameras installed on a vehicle (in other words, the system estimates camera calibration parameters). The system thus eliminates the need for any camera calibration requiring special setup, such as, for example, a vehicle manufacturer or factory end-of-line process or service or the like.

The conditions for the calibration system include: $R_{cal}$= (Yaw, Pitch, Roll) and $T_{cal}=(X_{cal}, Y_{cal}, Z_{cal})$. The vehicle is moving on the road with arbitrary patterns or texture (in other words, no lane markings or other markings or similar patterns or texturing needed) and along an arbitrary path (with no special maneuvers being needed, such as planned or specific turns or routing, such as driving in a circular loop or the like). The system may utilize a motion model for the camera calibration, such as a kinematic model of vehicle motion of the types described in U.S. patent application Ser. No. 14/282,029, filed May 20, 2014 by James Turk for VEHICLE VISION SYSTEM USING KINEMATIC MODEL OF VEHICLE MOTION, and published Nov. 27, 2014 as U.S. Publication No. US-2014-0350834 , and U.S. provisional application Ser. No. 61/825,753, filed May 21, 2013, which are hereby incorporated herein by reference in their entireties.

Thus, and as can be seen with reference to FIGS. 5-8, the system receives image data from a camera or cameras of the vehicle and extracts and matches features over multiple images or frames of captured image data. The system also receives data from a kinematic model of vehicle motion (such as a kinematic model of vehicle motion of the types described in U.S. patent application Ser. No. 14/282,029, filed May 20, 2014 by James Turk for VEHICLE VISION SYSTEM USING KINEMATIC MODEL OF VEHICLE MOTION, and published Nov. 27, 2014 as U.S. Publication No. US-2014-0350834, and U.S. provisional application Ser. No. 61/825,753, filed May 21, 2013, which are hereby incorporated herein by reference in their entireties), and determines the vehicle motion between frames and, based on initial parameter estimations and camera intrinsic parameters, the system determines the calibration parameters for the camera.

Figure 12:
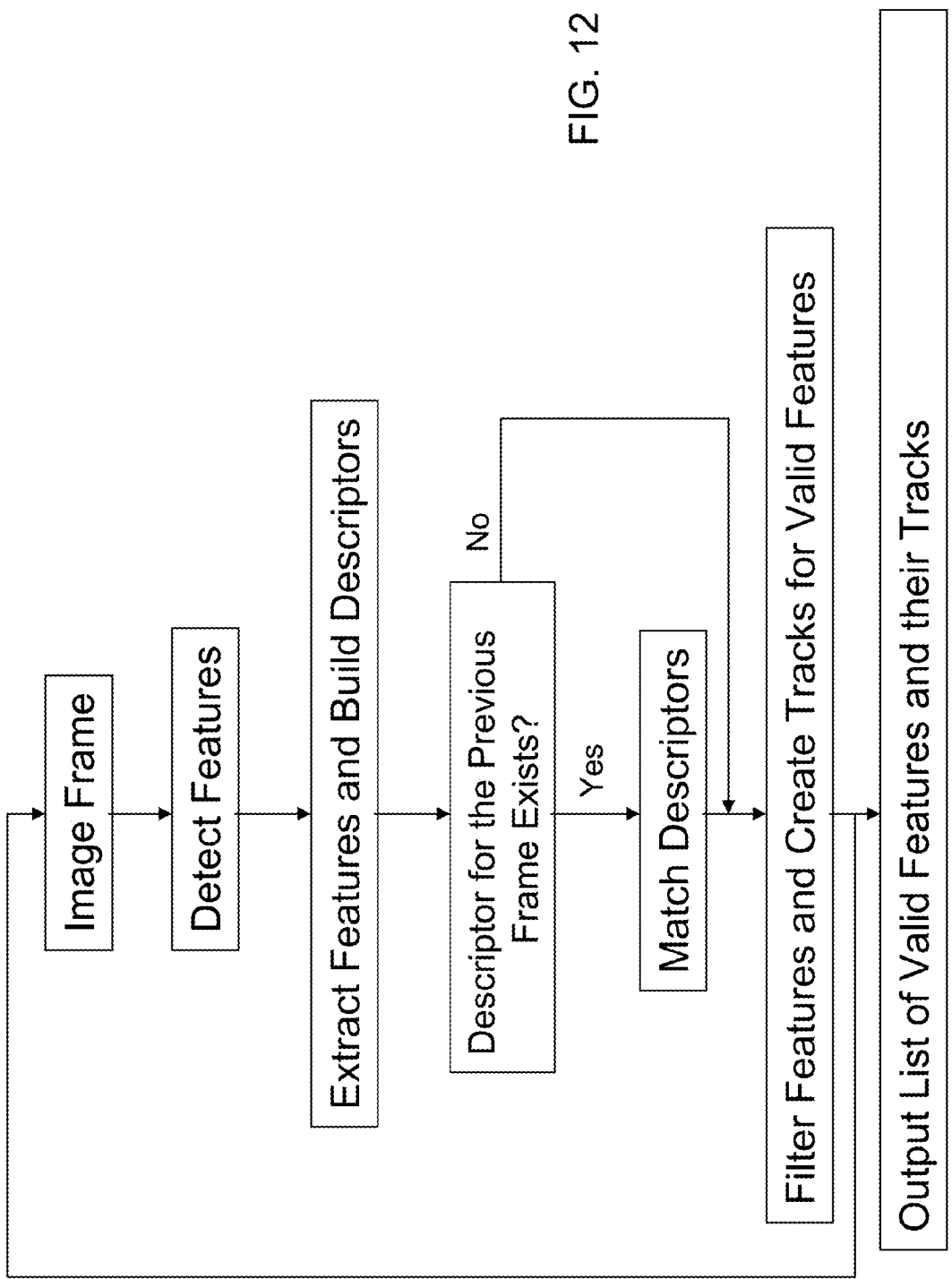
FIG. 12 is a flow chart of the feature extraction and matching process or algorithm of the system of the present invention.

The targetless software calibration system of the present invention uses software modules such as an interface software module (which provides an image input or image data input and/or a network input or CAN input to the system) and a kinematic model input. The system uses image processing to provide feature detection, feature extraction, feature matching and feature filtering, and uses computer vision to provide a calibration parameters setup, structure-from-motion, a bundle adjustment, and an averaging of calibration results. For example, and as shown in FIG. 12, the system uses feature detection (FIG. 9), and extracts and matches feature descriptors (FIG. 10) and creates feature matches (FIG. 11), and outputs a list of valid features and their movements or movement patterns. The feature filtering (FIG. 13) enhances the structure-from-motion and bundle adjustment by eliminating feature pairs that do not satisfy the established rules for valid feature pairs in valid frame pairs.

Figure 9:
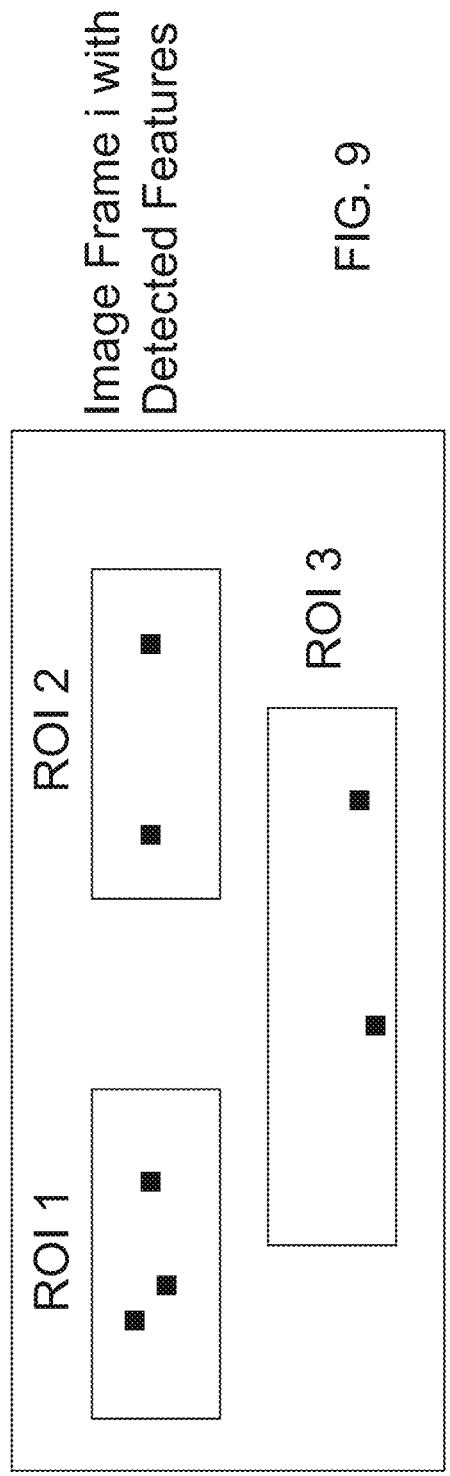
FIG. 9 shows details of a feature detection algorithm or process of the system of the present invention.

As shown in FIG. 9, the feature detection may detect features within an image frame. The system thus may detect N features (such as three features shown in FIG. 9) in three separate rectangular constant image ROIs, with the detection occurring periodically, such as every K frames (such as every frame or every other frame or every third frame or the like). The feature detection may utilize various detection methods, such as a Harris corner detector, speeded-up robust features (SURF), minimum eigenvalue and/or the like. The input may comprise a sequence of images with the ROI locations and dimensions, which may be constant for each image in the sequence. The output may comprise a list of pixel coordinates for each detected feature in each image frame.

As shown in FIG. 10, the system may utilize extraction and matching of feature descriptors. For each detected feature in each image of the sequence of images, the system may build a descriptor, an m-dimensional vector, based on the image information in the neighborhood of the feature. The system may match the descriptor based on the distance $d_{ij}$ from each other in frames i and j. The input may comprise image coordinates of the detected features in each image and the output may comprise a descriptor for each features, a list of matched features and a match metric.

Thus, the present invention provides a targetless camera calibration system that is operable to calibrate the cameras during any normal driving movement of the vehicle equipped with the cameras and calibrated systems. The system algorithm, when the system is calibrating more than one camera of the vehicle, does not use overlap image areas between the cameras. The system may calibrate the cameras when the vehicle and/or camera(s) undergo any movement in six degrees of freedom (such as translational movements (x, y, z) forward/backward, side to side, up/down, and such as rotational movements pitch, yaw, roll). The system achieves the calibration by matching features over multiple captured images and determining how the features position or location in the captured images may be different from where they would be with a properly calibrated camera, based at least in part on an input of a kinematic model of the actual vehicle movement.

Various vehicle camera calibration systems have been proposed, such as those described in U.S. Pat. Nos. 8,421, 865; 7,914,187; and/or 7,949,486, and/or PCT Application No. PCT/US2011/036967, filed May 18, 2011, and/or PCT Application No. PCT/CA2012/000378, filed Apr. 25, 2012, and/or PCT Application No. PCT/US2012/064980, filed Nov. 14, 2012, which are all hereby incorporated herein by reference in their entireties. Such systems typically use and rely on a reference element on the vehicle itself. For outside viewing cameras (such as a side camera disposed at or in an exterior rearview mirror of the vehicle), the vehicle manufacturer may initially calibrate the camera in the vehicle assembly plant, where the system is trained or set to correctly display on the screen what is actually occurring or existing in real life on the ground at or near the vehicle. If nothing changes over time, the system will continue to work properly. But over time, things change (for example, the exterior mirror may be moved in any of six degrees of freedom, such as along the x, y and z directions and/or about three rotational axes), and the camera follows any changes in the mirror so that what is shown on the display screen may no longer be true to the actual outside scene or reality. With multiple cameras, this may become critical if one camera is out of sync with other cameras. While use of a reference point works to calibrate the cameras, the reference point may also be changed on the vehicle.

The system of the present invention calibrates the cameras of the vehicle multi-camera system without use of reference points on the vehicle. The system figures out that a camera is out of calibration and then figures out how to calibrate it, all while the vehicle is being normally driven by the driver.

While the vehicle is driven along a road, the cameras capture frames of image data, and the system identifies or tags features in the captured images (such as, for example, a tree or a mailbox or a sign or the like) and then over a set of frames the system matches the features to determine how they are moving in the captured image and relative to the vehicle movement. The system receives an input from a kinematic model that provides kinematic data that indicates exactly how the vehicle is moving in reality. The control of the system thus knows how the vehicle moved in reality (over the period of time that the frames were captured) and knows how the determined and matched features have moved as the camera has seen them (over the period of time that the frames were captured), and thus the control sees how and where the features are moving on the image plane itself. Thus, the system knows that for a given real movement of the vehicle (such as based on a kinematic model), a determined feature in the camera's field of view should move in a particular manner and should appear at a particular location at a particular time or amount of movement of the vehicle (such as in a successive captured image or frame of image data). When the system determines that a feature is not where it is expected to be, the system can determine that the camera is out of calibration or misaligned, and can adjust the camera and/or image processing and/or display characteristics accordingly.

The system may also determine if the object is also moving, in order to avoid a false determination of camera misalignment when the object is moving as well as the vehicle and not with the vehicle (and thus does not appear where it is expected to be). For example, with a multi-camera system, two cameras may capture images of the object, and the system may determine whether or not the object is moving by comparing the image data captured by the two cameras. With the system determining that the object is stationary (such as by seeing that the "movement" of the object in the captured image data, such as due to the vehicle movement, is the generally the same between the two sets of multiple frames of captured image data), the system can then determine whether one of the two cameras is misaligned, as discussed above.

Thus, the targetless calibration system of the present invention is operable to calibrate a camera or cameras of a vehicle without use of reference points on or off the vehicle. The output of the calibration process is an exact or substantially exact location and orientation of the camera with respect to vehicle coordinate system (whereas known systems may calculate a transform function and use a corresponding look-up table to generate a transfer map between the raw image data and display screen). The system of the present invention has no constraints on the driving maneuvers of the vehicle (in other words, the driver is not required to drive in a straight line for a period of time during calibration), and the system is operable to determine the calibration of the cameras during any driving maneuvers of the vehicle.

Also, if the vehicle is driven in straight line only, then only four degrees of freedom of the camera can be calibrated, namely the three rotational axes (pitch, yaw and roll) and the camera height. Such straight line driving constraints are unnatural constraints on driving. However, with the present invention, the vehicle may be driven in a normal manner, with turns involved. When the vehicle is driven naturally, with turns involved, then all six degrees of freedom of the camera can be checked and calibrated (so the location and orientation of the camera can be determined). The calibration time is shortened by the system of the present invention because no time is wasted when the vehicle turns naturally as the calibration process is not suspended for the duration of the turn.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/248,602, filed Apr. 9, 2014; Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013 ; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; and/or Ser. No. 61/813,361, filed Apr. 18, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392;

6,320,176; 6,313,454; and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-

0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera calibration system of a vehicle, said camera calibration system comprising:
a camera disposed at a vehicle and having a field of view exterior of the vehicle;
wherein said camera comprises a two dimensional array having a plurality of photosensing elements;
wherein said camera is operable to capture image data;
an image processor operable to process image data captured by said camera;
wherein said camera calibration system is operable to generate camera calibration parameters utilizing a bundle adjustment algorithm;
wherein said bundle adjustment algorithm uses a kinematic model of vehicle motion derived from image processing by said image processor of multiple frames of captured image data;
wherein said bundle adjustment algorithm generates calibration parameters utilizing the equation:

$$X_{image} = P * X_w,$$

where $X_{image}$ is a selection of image points in captured image data, P is a projective matrix representing motion between frames of captured image data, and $X_w$ is a vector of world coordinates of image points in captured image data;
wherein, responsive to image processing by said image processor of multiple frames of captured image data, said camera calibration system extracts and matches features determined in multiple frames of captured image data;
wherein, responsive to image processing by said image processor of captured image data during movement of the vehicle along an arbitrary path, and responsive to generation of camera calibration parameters utilizing said bundle adjustment algorithm, said camera calibration system is operable to calibrate said camera; and
wherein said camera calibration system calibrates said camera as the vehicle navigates the arbitrary path, and wherein calibration of said camera includes correction for misalignment in yaw, pitch and roll angles of said camera.

2. The camera calibration system of claim 1, wherein said bundle adjustment algorithm iteratively refines calibration parameters starting from a known initial estimation.

3. The camera calibration system of claim 1, wherein said bundle adjustment algorithm solves for calibration parameters and actual coordinates of an object present in the field of view of said camera.

4. The camera calibration system of claim 1, wherein said image processor is operable to calibrate said camera without image processing of image data representative of captured images of a target.

5. The camera calibration system of claim 1, comprising a plurality of cameras disposed at the vehicle and having respective fields of view exterior of the vehicle, wherein said image processor is operable to process image data captured by said cameras, and wherein said image processor is operable to calibrate said cameras without use of targets in the field of view of said cameras and without image processing of image data representative of captured images of targets.

6. The camera calibration system of claim 1, wherein the generated camera calibration parameters comprise at least one of (i) at least one of translational components X, Y, Z and (ii) at least one of rotational components Yaw, Pitch and Roll.

7. The camera calibration system of claim 1, wherein the generated camera calibration parameters comprise (i) translational components X, Y, Z and (ii) rotational components Yaw, Pitch and Roll angles.

8. The camera calibration system of claim 1, wherein said camera calibration system comprises a plurality of cameras disposed at the vehicle, each having a respective field of view exterior of the vehicle.

9. The camera calibration system of claim 8, wherein image data captured by at least some of said plurality of cameras is used for a surround view system of the vehicle.

10. The camera calibration system of claim 9, wherein one of said cameras comprises a rear camera disposed at a rear portion of the vehicle, and another of said cameras comprises a side camera disposed at a driver-side exterior rearview mirror assembly of the vehicle and another of said cameras comprises a passenger side camera disposed at a passenger-side exterior rearview mirror assembly of the vehicle.

11. A camera calibration system of a vehicle, said camera calibration system comprising:
a plurality of cameras disposed at a vehicle, each having a respective field of view exterior of the vehicle;

wherein said plurality of cameras comprises (i) a rear camera disposed at a rear portion of the vehicle and having a rearward field of view, (ii) a driver-side camera disposed at a driver-side exterior rearview mirror assembly of the vehicle and at least having a generally sideward and rearward field of view and (iii) a passenger-side camera disposed at a passenger-side exterior rearview mirror assembly of the vehicle and at least having a generally sideward and rearward field of view;

wherein said cameras are operable to capture image data;

an image processor operable to process image data captured by said cameras;

wherein said camera calibration system is operable to generate camera calibration parameters for each of said cameras utilizing a bundle adjustment algorithm;

wherein said bundle adjustment algorithm uses a kinematic model of vehicle motion derived from image processing by said image processor of multiple frames of image data captured by each of said cameras;

wherein said bundle adjustment algorithm generates calibration parameters utilizing the equation:

$$X_{image} = P * X_w,$$

where $X_{image}$ is a selection of image points in captured image data, P is a projective matrix representing motion between frames of captured image data, and $X_w$ is a vector of world coordinates of image points in captured image data;

wherein, responsive to image processing by said image processor of multiple frames of image data captured by each of said cameras, said camera calibration system extracts and matches features determined in multiple frames of image data captured by each of said cameras;

wherein, responsive to image processing by said image processor of captured image data during movement of the vehicle along an arbitrary path, and responsive to generation of camera calibration parameters utilizing said bundle adjustment algorithm, said camera calibration system is operable to calibrate each of said cameras; and wherein said camera calibration system calibrates each of said cameras as the vehicle navigates the arbitrary path, and wherein calibration of each of said cameras includes correction for misalignment in yaw, pitch and roll angles of each of said cameras.

12. The camera calibration system of claim 11, wherein said bundle adjustment algorithm iteratively refines calibration parameters starting from a known initial estimation.

13. The camera calibration system of claim 11, wherein said bundle adjustment algorithm solves for calibration parameters and actual coordinates of an object present in the field of view of said camera.

14. The camera calibration system of claim 11, wherein the generated camera calibration parameters comprise at least one of (i) at least one of translational components X, Y, Z and (ii) at least one of rotational components Yaw, Pitch and Roll.

15. The camera calibration system of claim 11, wherein the generated camera calibration parameters comprise (i) translational components X, Y, Z and (ii) rotational components Yaw, Pitch and Roll.

16. The camera calibration system of claim 11, wherein each of said cameras comprises a two dimensional array of a plurality of photosensing elements.

17. The camera calibration system of claim 11, wherein image data captured by at least some of said plurality of cameras is used for a surround view system of the vehicle.

18. A camera calibration system of a vehicle, said camera calibration system comprising:

a plurality of cameras disposed at the vehicle, each having a respective field of view exterior of the vehicle;

wherein each of said cameras comprises a two dimensional array of a plurality of photosensing elements;

wherein said plurality of cameras comprises a rear camera disposed at a rear portion of the vehicle, a driver side camera disposed at a driver-side exterior rearview mirror assembly of the vehicle and a passenger side camera disposed at a passenger-side exterior rearview mirror assembly of the vehicle;

wherein each of said cameras is operable to capture image data;

an image processor operable to process image data captured by said cameras;

wherein image data captured by at least some of said plurality of cameras is used for a surround view system of the vehicle;

wherein said camera calibration system is operable to generate camera calibration parameters utilizing a bundle adjustment algorithm;

wherein said bundle adjustment algorithm uses a kinematic model of vehicle motion derived from image processing by said image processor of multiple frames of image data captured by each of said cameras;

wherein said bundle adjustment algorithm generates calibration parameters utilizing the equation:

$$X_{image} = P * X_w,$$

where $X_{image}$ is a selection of image points in captured image data, P is a protective matrix representing motion between frames of captured image data, and $X_w$ is a vector of world coordinates of image points in captured image data;

wherein, responsive to image processing by said image processor of multiple frames of image data captured by each of said cameras, said camera calibration system extracts and matches features determined in multiple frames of image data captured by each of said cameras;

wherein the generated camera calibration parameters comprise (i) at least one of translational components X, Y, Z and (ii) at least one of rotational components Yaw, Pitch and Roll;

wherein, responsive to image processing by said image processor of captured image data during movement of the vehicle along an arbitrary path, and responsive to generation of camera calibration parameters utilizing said bundle adjustment algorithm, said camera calibration system is operable to calibrate at least one of said cameras; and wherein said camera calibration system calibrates each of said cameras as the vehicle navigates the arbitrary path, and wherein calibration of each of said cameras includes correction for misalignment in yaw, pitch and roll angles of each of said cameras.

19. The camera calibration system of claim 18, wherein said bundle adjustment algorithm iteratively refines calibration parameters starting from a known initial estimation.

20. The camera calibration system of claim 19, wherein said bundle adjustment algorithm solves for calibration parameters and actual coordinates of an object present in the field of view of said at least one of said cameras.

* * * * *

UNITED STATES PATENT AND TRADEMARK OFFICE
CERTIFICATE OF CORRECTION

PATENT NO. : 9,563,951 B2
APPLICATION NO. : 14/282028
DATED : February 7, 2017
INVENTOR(S) : Okouneva Page 1 of 1

It is certified that error appears in the above-identified patent and that said Letters Patent is hereby corrected as shown below:

In the Specification
Column 7
Line 45, "2013Ser." should be --2013 Ser.--;

In the Claims
Column 14
Line 35, Claim 18 "protective" should be --projective--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*